United States Patent
Baetge et al.

(10) Patent No.: US 9,062,580 B2
(45) Date of Patent: Jun. 23, 2015

(54) EXHAUST GAS SYSTEM WITH HC ADSORBER AND PARALLEL CATALYTIC CONVERTER, AND VEHICLE COMPRISING SUCH AN EXHAUST GAS SYSTEM

(75) Inventors: Jörg-Dieter Baetge, Lehre (DE); Alf Degen, Meinersen (DE); Markus Paulovsky, Wolfsburg (DE); Valeri Seiler, Wahrenholz (DE); Peter Männel, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 14/118,823

(22) PCT Filed: Apr. 16, 2012

(86) PCT No.: PCT/EP2012/001640
§ 371 (c)(1),
(2), (4) Date: Nov. 19, 2013

(87) PCT Pub. No.: WO2012/156012
PCT Pub. Date: Nov. 22, 2012

(65) Prior Publication Data
US 2014/0102083 A1    Apr. 17, 2014

(30) Foreign Application Priority Data
May 19, 2011   (DE) .......................... 10 2011 101 982

(51) Int. Cl.
*F01N 3/10*   (2006.01)
*F01N 3/08*   (2006.01)
*F01N 13/00*   (2010.01)

(52) U.S. Cl.
CPC ............... *F01N 3/10* (2013.01); *F01N 3/0814* (2013.01); *F01N 3/0835* (2013.01);
(Continued)

(58) Field of Classification Search
CPC ... F01N 3/0814; F01N 3/0835; F01N 3/0878; F01N 3/10; F01N 13/0097; F01N 2260/14; F01N 2410/10

USPC .......................................................... 60/299
See application file for complete search history.

(56) References Cited

U.S. PATENT DOCUMENTS

| | | | |
|---|---|---|---|
| 5,223,009 A | 6/1993 | Schuster et al. | |
| 5,315,824 A | 5/1994 | Takeshima | |

(Continued)

FOREIGN PATENT DOCUMENTS

| | | |
|---|---|---|
| DE | 41 30 178 C1 | 8/1992 |
| DE | 197 40 702 C1 | 11/1998 |

(Continued)

OTHER PUBLICATIONS

English translation of Japanese Patent Application Publication No. JP 2000337135A (Dec. 5, 2000).*

(Continued)

*Primary Examiner* — Jason Shanske
(74) *Attorney, Agent, or Firm* — Pearl Cohen Zedek Latzer Baratz LLP

(57) ABSTRACT

The invention relates to an exhaust gas system (10) for an internal combustion engine (12), having an exhaust gas path which includes at least in sections two parallel exhaust gas lines (34, 36), namely a main line (34) and an auxiliary line (36), an adsorber (46) for reversible sorption of unburnt hydrocarbons (HC) and/or nitrogen oxides ($NO_x$) being situated in the auxiliary line (36); having an adjusting means (48) for selectively guiding an exhaust gas flow into the main line (34) and/or into the auxiliary line (36) and having a main catalytic converter (44) situated downstream from the parallel exhaust gas lines (33, 36). An exhaust gas flow-conducting, gas-permeable element (58) is provided upstream from the adsorber (46), which separates the auxiliary line (36) from the remaining exhaust gas flow-conducting areas. In addition, the adsorber (46) may also be equipped with a particle filtering function and/or a catalytic function.

17 Claims, 2 Drawing Sheets

(52) U.S. Cl.
CPC .......... *F01N 3/0878* (2013.01); *F01N 2260/14* (2013.01); *F01N 2260/16* (2013.01); *F01N 2410/02* (2013.01); *F01N 2470/02* (2013.01); *Y02T 10/22* (2013.01); *F01N 13/0097* (2014.06)

(56) References Cited

U.S. PATENT DOCUMENTS

| | | | |
|---|---|---|---|
| 6,112,519 A * | 9/2000 | Shimasaki et al. | 60/300 |
| 2002/0132726 A1 | 9/2002 | Endo et al. | |
| 2004/0067177 A1 * | 4/2004 | Thieman et al. | 422/177 |
| 2004/0211172 A1 * | 10/2004 | Wang et al. | 60/299 |
| 2006/0123772 A1 | 6/2006 | Iwamoto et al. | |
| 2007/0134138 A1 | 6/2007 | Matsuo et al. | |
| 2008/0236913 A1 * | 10/2008 | Ichimoto | 180/65.2 |
| 2010/0011746 A1 * | 1/2010 | Lupescu | 60/278 |

FOREIGN PATENT DOCUMENTS

| | | |
|---|---|---|
| DE | 100 21 421 A1 | 2/2002 |
| DE | 10 2006 003 848 A1 | 2/2007 |
| DE | 10 2006 058554 A1 | 6/2007 |
| DE | 10 2009 041 345 A1 | 4/2011 |
| EP | 1 400 665 A1 | 3/2004 |
| GB | 2428603 A | 2/2007 |
| JP | 2000 337135 A | 12/2000 |
| JP | 2008-133802 | 6/2008 |

OTHER PUBLICATIONS

International Search Report for International Application No. PCT/EP2012/001640 mailed Jul. 26, 2012.

German Search Report for German Application No. 10 2011 101 982.4 dated Feb. 17, 2012.

* cited by examiner

EXHAUST GAS SYSTEM WITH HC ADSORBER AND PARALLEL CATALYTIC CONVERTER, AND VEHICLE COMPRISING SUCH AN EXHAUST GAS SYSTEM

CROSS-REFERENCE TO RELATED APPLICATIONS

This application is a National Phase Application of PCT International Application No. PCT/EP2012/001640, International Filing Date Apr. 16, 2012, claiming priority of German Patent Application No. 10 2011 101 982.4, filed May 19, 2011, which is hereby incorporated by reference.

FIELD OF THE INVENTION

The present invention relates to an exhaust gas system having an adsorber and a vehicle which includes such an exhaust gas system.

BACKGROUND OF THE INVENTION

The use of catalytic converters in the exhaust gas systems of internal combustion engines is commonplace nowadays. For example, diesel engines in particular use oxidation catalytic converters which convert unburnt hydrocarbons (HC) and carbon monoxide (CO), and both diesel engines and gasoline engines use reduction catalytic converters which convert nitrogen oxides ($NO_x$). Also known are three-way catalytic converters which combine the functions of the oxidation and reduction catalytic converters, and therefore catalytically convert all three components, and are used mainly in gasoline engines. In principle, all catalytic converters require a specific minimum temperature, the light-off or start-up temperature at which they convert 50% of the limited exhaust gas constituents. After an engine cold start this temperature is normally not yet reached, so that if no further steps are taken, the emissions, referred to as cold-start emissions, exit the exhaust gas system unconverted.

Present, and even more so, future exhaust gas legislations require cold-start emissions measured in standardized driving cycles to also be recorded for determining the total emissions of a vehicle. The desire for further reduction of emissions and the increasingly reduced legal exhaust gas limits also require the reduction of cold-start emissions and therefore reaching the operating temperature of the catalytic converter system sooner.

A common measure for reducing cold-start emissions entails placing relatively small-volume precatalytic converters close to the engine, also referred to as primary catalytic converters. Due to their limited volume and their placement close to the engine, precatalytic converters quickly reach their light-off temperature, then take over conversion of a large portion of the emissions until a main catalytic converter connected downstream has also reached its operating temperature.

An exhaust gas system is known from DE 100 21 421 A1 in which an exhaust gas turbine of an exhaust gas turbocharger is situated in a main line of the exhaust gas duct, and the turbine may be bypassed by a bypass line routed in parallel. Situated in the bypass line is a precatalytic converter configured as a three-way catalytic converter or as an HC adsorber. A controllable valve may alternately shut off the bypass line or the main line, in which intermediate settings may also be provided. After a cold start the entire exhaust gas flow is guided initially through the bypass line via the precatalytic converter. Once a main catalytic converter connected downstream has reached its start-up temperature, the valve is switched over and the exhaust gas flow is guided into the main line via the exhaust gas turbine.

US 2002/0132726 A1 describes an exhaust gas system which includes a main catalytic converter, downstream from which are two parallel exhaust gas lines which may be alternately closed and opened with the aid of a switchover valve. The two parallel exhaust gas lines are arranged concentrically with an internal main line surrounded concentrically by an auxiliary line in which a ring-shaped HC adsorber is situated. Branching off from the auxiliary line upstream from the HC adsorber is a return line which feeds hydrocarbons which are unburnt and desorbed by the adsorber to the internal combustion engine. After a cold start the internal main line is closed and the exhaust gas flow is guided over the HC adsorber, which adsorbs and/or chemisorbs the unburnt hydrocarbons HC and hydrocarbons not converted by the not yet operational main catalytic converter. Once the main catalytic converter has reached its operating temperature, thereby ensuring sufficient HC conversion, the exhaust gas flow is directed into the main line. As a result of the heating now taking place the hydrocarbons desorb from the HC adsorber and are delivered to the engine combustion via the return line.

A similar concept is known from U.S. Pat. No. 5,315,824, which also employs the concentric structure consisting of an externally situated HC adsorber with a cordierite coating and an internally situated main line, the main catalytic converter in this concept being connected downstream from the HC adsorber, however. In addition, the exhaust gas system includes a precatalytic converter which is situated close to the engine. In this design, the return line described in US 2002/0132726 A1 is omitted. Instead, the desorbed hydrocarbons are converted by the main catalytic converter connected downstream. After an engine cold start, the exhaust gas in this case is guided initially over the HC adsorber which stores hydrocarbons at temperatures up to about 90° C. By the time the HC adsorber, depending on the temperature, starts to desorb the hydrocarbons, the precatalytic converter has reached a temperature which permits conversion of hydrocarbons emitted from the engine. In this phase, the exhaust gas is guided through the main line in order to bypass the HC adsorber. Once the main catalytic converter connected downstream has reached its light-off temperature at least in some sectors, the exhaust gas is again guided over the HC adsorber in order to flush the hydrocarbons released from the HC adsorber into the main catalytic converter and to convert them. The design approach of guiding exhaust gas in parallel proposed herein is relatively complex.

A simpler and more cost-effective design for the parallel guidance of exhaust gas is known from JP 2008-133802 A (see FIG. 2 of the present application), in which the ring-shaped HC adsorber is supported on a concentric inner pipe which defines the main line and which projects upstream beyond the length of the HC adsorber. Situated in this projecting section of the inner pipe is a rotatable exhaust gas valve which may close or open the interior main line. In the closed position the exhaust gas is guided over the adsorber, whereas in the open position the major portion of the exhaust gas flow passes the interior main line due to the greater flow resistance of the adsorber. Moreover, the flow resistance of the auxiliary line is increased as a result of an aperture plate with defined through-holes which is situated downstream from the ring-shaped HC adsorber. However, the need for this aperture plate again means increased design complexity. Moreover, despite this measure, it is not possible to prevent entirely a leakage flow through the HC adsorber when the exhaust gas valve is opened.

Finally, common to all of the designs discussed above is the fact that the ring-shaped HC adsorber is mounted on a pipe which is situated concentrically inwardly, for which reason virtually the only carriers contemplatable for the HC adsorber are wound metal carriers. Fitting of ceramic carriers (monoliths), which due to their impact sensitivity require an embedding (canning) along both their exterior and interior circumferences, would be very costly. Nevertheless, the use of ceramic carriers is desirable inter alia because they may, for example, be provided with a particle filtering function.

SUMMARY OF THE INVENTION

The object of the present invention is to further refine the aforementioned related art in such a way that a leakage flow of exhaust gas through the adsorber is reduced when the exhaust gas adjusting means (for example, exhaust gas valve) is opened. In addition, the exhaust gas system should ideally be designed to also enable the use of ceramic carriers for the HC adsorber at reasonable cost.

These objects are achieved at least in part by an exhaust gas system and a vehicle having the features of the independent claims.

The exhaust gas system according to the present invention for an internal combustion engine includes an exhaust gas path which has at least in sections two parallel exhaust gas lines, namely a main line and an auxiliary line. Situated in the auxiliary line is an adsorber for reversible sorption of unburnt hydrocarbons (HC) and/or nitrogen oxides ($NO_x$). Also provided is an adjusting means for selectively guiding an exhaust gas flow into the main line and/or into the auxiliary line. The exhaust gas system further includes a shared main catalytic converter situated in the exhaust gas path downstream from the parallel exhaust gas lines. The exhaust gas system according to the present invention is distinguished by the fact that situated upstream from the adsorber is an exhaust gas flow-conducting, gas-permeable element which separates the auxiliary line (and thus the inlet area of the adsorber) from the remaining exhaust gas-conducting areas of the exhaust gas system.

As a result of the separation of the auxiliary line housing the adsorber from the remaining line areas, in particular from the main line which bypasses the adsorber, by the arrangement of the exhaust gas flow-conducting, gas-permeable element according to the present invention, it is possible on the one hand to eliminate the aperture plate described in the related art downstream from the adsorber. At the same time, the so-called leakage flow of exhaust gas which flows through the adsorber when the adjusting means is opened, is reduced as a result of this measure. The reason for this is seen primarily in the fact that the flow resistance caused by the gas-permeable element is already situated upstream from the adsorber, as a result of which the exhaust gas flow never even reaches the adsorber.

Within the scope of the present invention the term "parallel exhaust gas lines" is not necessarily understood in a geometric sense, but rather fluidic in such a way that the two exhaust gas lines constitute alternative flow paths for the exhaust gas flow. In other words, an individual volume of exhaust gas always passes through just one of the two parallel exhaust gas lines. Furthermore, the term "parallel exhaust gas line(s)" or "main line" or "auxiliary line" does not necessarily mean the presence of a pipe which surrounds the corresponding line. Instead, these terms refer solely to a flow path of the exhaust gas which may be defined by any arbitrary components.

In a specific embodiment of the present invention the exhaust gas flow-conducting, gas-permeable element is formed from an intrinsically gas-impermeable material which owes its gas permeability to a plurality of through openings for the exhaust gas flow. In particular, it may be designed as a perforated metal sheet, for example, a perforated pipe or a perforated plate. In any case, the gas permeability of the element is preferably adjusted to the exhaust gas in such a way that the exhaust gas pressure generated by the element in combination with the adsorber is high enough to create an optimally quantitative flow of the exhaust gas through the main line when the adjusting means is opened and, on the other hand, small enough to generate no impermissibly high counter pressure when the adjusting means is closed.

According to one further preferred embodiment, the parallel exhaust gas lines are designed in such a way that one of the parallel exhaust gas lines encloses at least sections of the other. This may be particularly preferably a concentric (coaxial) arrangement in which both lines have a shared center point or a shared central axis. The advantage of this design is an optimum utilization of overall space and a good mutual heat exchange. In this context, the auxiliary line which houses the adsorber may in particular enclose the main line. As a result, the adsorber is well cooled via the outer wall so that the former only belatedly reaches its desorption temperature, namely if possible, only when the main catalytic converter downstream or a precatalytic converter optionally provided close to the engine has reached its start-up temperature (light-off temperature). On the other hand the heated adsorber functions to preheat the exhaust gas and thus to heat more rapidly the main catalytic converter situated downstream.

The exhaust gas flow-conducting, gas-permeable element may advantageously have a tubular design, the upstream end of which is connected to a housing which accommodates the parallel exhaust gas lines or an inlet connection for such a housing. In the tubular design, the downstream end is preferably connected to an inlet opening of the interior line of the parallel exhaust gas lines, in particular the inlet opening of the main line. In this design, the exhaust gas is guided without resistance into the main line when the adjusting means is opened, only a negligible portion of which penetrates through the gas-permeable element so that the leakage flow is reduced still further. At the same time, the design of the exhaust gas flow-conducting, gas-permeable element having a tubular shape, for example, a perforated pipe, is simple to produce at a reasonable cost.

In conjunction with a tubular shape of the exhaust gas flow-conducting, gas-permeable element it is preferably also provided that the adjusting means is mounted in a downstream section of the element in order to selectively guide the exhaust gas into the main and/or auxiliary line. Thus, when the adjusting means is in the closed position the main line is closed so that the exhaust gas acts on and penetrates the gas-permeable areas of the element situated further upstream.

The adjusting means may, for example, be designed as an exhaust gas valve which may be in particular rotatably mounted in the tubular shaped exhaust gas flow-conducting, gas-permeable element.

According to one further advantageous embodiment, the adjusting means for selectively guiding the exhaust gas flow into the main line and/or the auxiliary line is designed to be able to assume, in addition to a closed position and an open position, at least one intermediate position, in which one portion of the exhaust gas flow is directed into the main line and the other portion of the exhaust gas flow is directed into the auxiliary line. Preferably, the adjusting means is continuously adjustable between the closed [and] the opened position. By thus not configuring the adjusting means as a 2-point element with the positions OPEN and CLOSED, but in which intermediate positions are also possible in which a variable portion of the exhaust gas flow is guided over the adsorber and the other portion through the main line, it is possible to match the distribution of exhaust gas more precisely to the degree of heating of the exhaust gas purification components.

According to one particularly preferred embodiment of the present invention, the adsorber is circular in shape, the main line being defined essentially by a cavity enclosed by the adsorber. In this configuration, therefore, the outer wall profile of the main line is defined by the adsorber, at least in sections, for which no actual pipe is provided. In addition to a simpler design resulting from the elimination of an inner pipe supporting the adsorber, this configuration also makes it simpler to use a ceramic carrier for the adsorber, of which one further preferred embodiment of the present invention makes use.

Thus, the ceramic carrier (monolith) need only be supported on its outer circumference in a shock-absorbing embedding material in an exterior housing, while a corresponding structurally complex canning on the inside is eliminated.

Within the scope of the present invention, the term "adsorber" is understood to mean a component which may be perfused by an exhaust gas, which is capable of reversibly sorbing an exhaust gas constituent through adsorption and/or absorption. The adsorber may be an HC adsorber for reversibly storing hydrocarbons (HC) and/or an $NO_x$ adsorber for reversibly storing nitrogen oxides, for example by chemisorption. Preferably, it is designed as an HC adsorber. Corresponding coatings (for metallic or ceramic carriers) which fulfill these tasks are sufficiently known in the related art.

According to one advantageous embodiment, the adsorber in addition to its storage function for HC and/or $NO_x$ may also have a particle filtering function. Such a function may be implemented by using a ceramic carrier in a fundamentally known manner via closed flow channels of the ceramic carrier material.

In addition or alternatively, the adsorber may also have a catalytic function, in particular a three-way catalytic function, i.e., a coating which contains a catalytic material. In the case of a three-way catalytic coating which effects conversion of the three exhaust gas constituents HC, CO and $NO_x$, the coating is, for example, platinum, rhodium and/or palladium, in particular a combination of platinum and rhodium or of palladium and rhodium. A combination of a three-way catalytic function and a particle filtering function is also referred to as a four-way catalytic converter.

According to one preferred embodiment the parallel exhaust gas lines, the adsorber, the exhaust gas flow-conducting, gas-permeable element and the adjusting means are situated in a shared housing, it being in particular preferred that the main catalytic converter connected downstream together with the aforementioned elements is accommodated in such a shared housing. Typically, such a housing may include a connecting piece on the intake side and a connecting piece on the outlet side which may be attached to the exhaust gas channel, for example, via flange connections. This catalytic converter unit which represents a further aspect of the present invention may, in particular, be situated on an undercarriage position of a vehicle.

A further aspect of the present invention relates to a vehicle which includes the exhaust gas system according to the present invention.

Further preferred embodiments of the present invention result from the remaining features cited in the subclaims.

BRIEF DESCRIPTION OF THE DRAWINGS

The present invention is explained below in exemplary embodiments below with reference to the associated drawings.

FIG. 1 shows a schematic overall view of an exhaust gas system 10 according to the present invention.

DETAILED DESCRIPTION OF THE INVENTION

Figure 1:
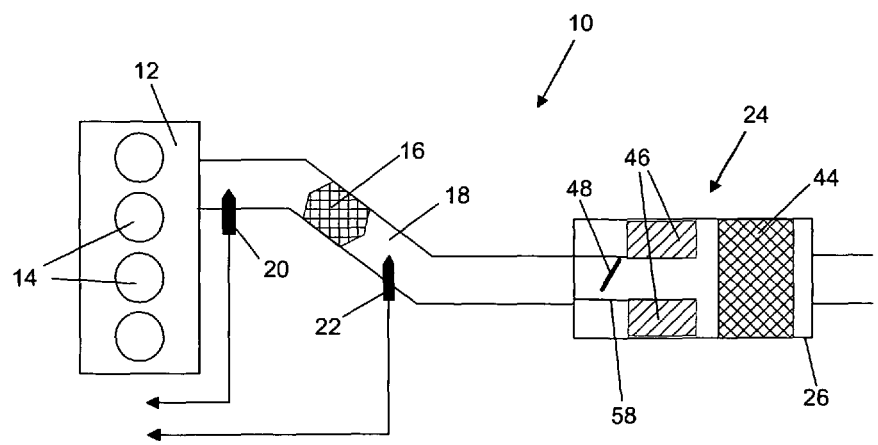
FIG. 1 schematically shows an exhaust gas system according to the present invention.

The exhaust gas of an internal combustion engine 12, for example, a gasoline engine, initially enters an exhaust manifold (not shown) via exhaust gas outlets of the engine cylinders 14. Positioned close to the engine, in particular directly adjacent to the exhaust manifold, may be a low-volume precatalytic converter 16 which carries out the function of a primary catalytic converter by rapidly heating up after a cold start of the internal combustion engine and taking over the main conversion capacity after light-off once the engine has started until a converter connected downstream is started up. Precatalytic converter 16 may, depending on the type of the internal combustion engine, be an oxidation or a three-way catalytic converter. Precatalytic converter 16 is attached via a flange connection, for example, to an exhaust pipe 18.

Positioned close to the engine upstream from precatalytic converter 16 is a first lambda sensor 20 which measures the oxygen content of the raw exhaust gas from the engine and is used for regulating the air-fuel mixture of the engine in a known manner. Moreover, a second lambda sensor 22 may be provided downstream from precatalytic converter 16. Second lambda sensor 22 may carry out various functions. For example, it may be used for diagnosing precatalytic converter 16, for adjusting the sensors relative to one another and/or for regulating the mixture.

The outlet end of exhaust pipe 18 is connected to a catalytic converter unit 24, a known design of which is described in greater detail below with reference to FIG. 2 and a design according to the present invention with reference to FIG. 3.

In the present example, catalytic converter unit 24 includes a shared catalytic converter housing 26 having a funnel-shaped inlet connection 28 on the inlet side and a likewise funnel-shaped outlet connection 30 on the outlet side. Inlet and outlet connections 28, 30 each taper outwardly so that their pipe diameter is adapted essentially to that of exhaust pipe 18. Attachment to the exhaust pipe may be accomplished, for example, with the aid of flange connections or the like.

According to the related art shown, a concentric inner pipe 32 is situated in an inlet section of catalytic converter housing 26 so that the exhaust gas path in this section splits into two parallel exhaust gas lines, namely an interior main line 34 and a ring-shaped auxiliary line 36 which encases main line 34. Parallel exhaust gas lines 34, 36 are merged again at a junction area 38. In the example shown, junction area 38 is configured as a collar-like expansion of inner pipe 32 and includes a plurality of junction openings 40 through which exhaust gas of auxiliary line 36 flows into a shared exhaust gas line 42.

Catalytic converter unit 24 contains various exhaust gas purification components. Thus, downstream from parallel exhaust gas lines 34, 36 a main catalytic converter 44 is situated in shared exhaust gas line 42 which includes, in particular, a three-way catalytic coating, and may thus be used for converting unburnt hydrocarbons HC, carbon monoxide CO and nitrogen oxides $NO_x$. Also situated in auxiliary line 36 is a ring-shaped adsorber 46 which is, in particular, an HC adsorber. In the related art, adsorber 46 includes for production engineering-related reasons a metallic carrier which typically consists of wound metal sheets. The metallic carrier has a zeolite coating capable of adsorptively bonding unburnt hydrocarbons HC and desorbing them again at high temperatures. Suitable HC adsorbers are known to those skilled in the art and require no further explanation.

Catalytic converter unit 24 also includes an adjusting means 48 for selectively diverting the exhaust gas flow into main line 34 and/or into auxiliary line 36. In the present example, adjusting means 48 is designed as a flap rotatable on an axis which is situated at the inlet side of inner pipe 32 and may be moved between an opened position and a closed position by a suitable actuator. In the closed position, the flap closes main line 34 so that the exhaust gas flow is channeled through auxiliary line 36 and over adsorber 46. In the opened position shown in FIG. 2, both main line 34 and auxiliary line 36 are opened. In order in this case to guide at least the main portion of the exhaust gas flow through main line 34, junction area 38 and in particular openings 40 thereof must be designed in such a way that a sufficiently high exhaust gas counter pressure is generated, smaller opening cross sections causing the exhaust gas counter pressure to increase and the exhaust gas flow to be forced more intensely through main line 34.

To control adjusting means 48 and thereby to guide the exhaust gas flow over adsorber 46 or through main line 34, temperature sensors 50, 52 are situated upstream from HC adsorber 46 in shared exhaust gas line 38 [sic; 42] upstream from main catalytic converter 44. Sensors 50, 52 measure the exhaust gas temperature and allow conclusions to be drawn about the temperatures of adsorber 46 or of main catalytic converter 44. It is also conceivable to install the temperature sensors directly in the corresponding components.

Figure 2:
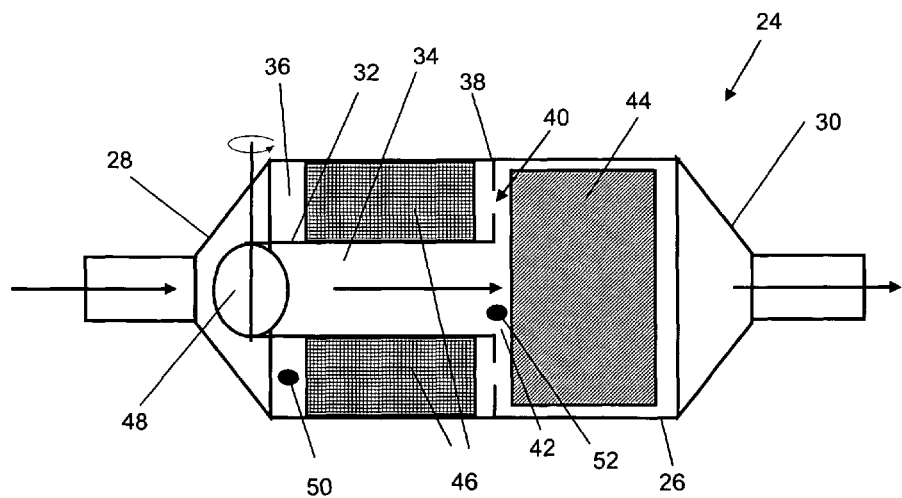
FIG. 2 shows a catalytic converter unit according to the related art for an exhaust gas system shown in FIG. 1.
Figure 3:
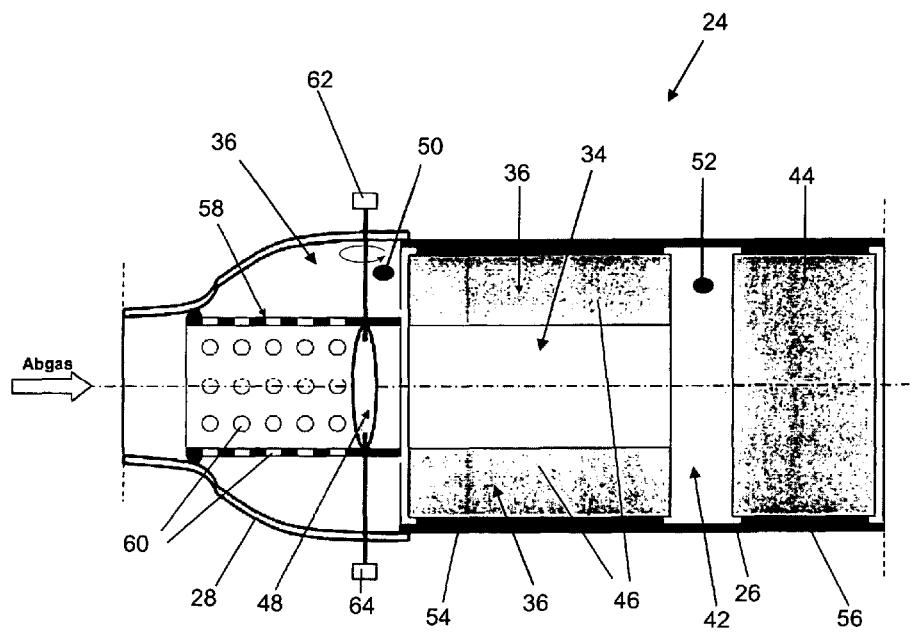
FIG. 3 shows a catalytic converter unit according to the present invention for an exhaust gas system as shown in FIG. 1 according to a first embodiment.

FIG. 3 shows a catalytic converter unit 24 according to a first embodiment of the present invention, in which the corresponding elements are provided with the same reference numerals indicated in FIG. 2. Unless mentioned otherwise, the features and function of the corresponding elements are the same.

Catalytic converter unit 24 again includes a catalytic converter housing 26, having an inlet connection 28 on the inlet side which tapers in the direction of engine 12 (as well as an outlet connection (not shown)). In addition, the exhaust gas path in an upstream area of catalytic converter unit 24 is partitioned, including a main line 34 and an auxiliary line 36, the latter coaxially enclosing main line 34 in the design shown. Situated in the auxiliary line is a ring-shaped adsorber 46, while downstream from parallel exhaust gas lines 34, 36 a main catalytic converter 44 is connected downstream in shared exhaust gas line 42.

Contrary to the design shown in FIG. 2, preferably no inner pipe 32 is provided in the assembly according to the present invention, which supports adsorber 46 and separates parallel exhaust gas lines 34, 36 from one another. Instead, the adsorber is retained solely by a shock-absorbing circumferential bearing means 54 in housing 26, which may be designed in particular as a fiber mat (for example, made of aluminum oxide fibers) or as a so-called intumescent mat. Main catalytic converter 44 is also retained in a corresponding bearing means 56. Such bearing means are generally known and serve primarily to fix the exhaust gas purification elements in the housing, to damp vibrations and to compensate for heat expansion, and therefore to avoid stresses. Hence, in this design, interior main line 34 is essentially delimited and defined by the interior cavity of adsorber 46. The elimination of inner pipe 32 has the advantage that it simplifies the use of a ceramic carrier for adsorber 34 [sic; 46] or even makes it at all possible, since an otherwise required mounting of ceramic adsorber 46 on the inner pipe and embedding it with a mounting mat as on the outer circumference is structurally very complex.

Situated upstream from adsorber 46 is, according to the present invention, an exhaust gas flow-conducting, gas-permeable element 58 which separates auxiliary line 36 which houses adsorber 46, and thereby the inlet area of adsorber 46, from the remaining exhaust gas conducting areas of exhaust gas system 10. In order to create gas permeability, element 58 includes a plurality of through openings 60. In the embodiment shown, element 58 has a tubular design and is with its front (upstream) end fastened, for example, by welding, to inlet connection 28. In a modification of the figure shown, element 58 may also be longer so that the front end thereof ends at or even projects beyond inlet connection 28 (see FIG. 4). In the latter case, the front edge of tubular element 58 may also be everted in a flange-like manner about the front edge of connection 28 and connected to the latter.

On the other side, the downstream end of element 58 is connected to the inlet opening of interior main line 34. In this configuration a small gap is preferably maintained between it and adsorber 46 in order to avoid a transfer of stress and shock. Thus, on the one side pipe element 58 projects freely and without contact into housing 26. As illustrated, the diameter of element 58 preferably corresponds to the clear inside diameter of adsorber 46 or to the width of main line 34 so that element 58 is essentially flush with main line 34 as defined by adsorber 46. In an alternative embodiment (not shown), element 58 may also have an outer diameter which is slightly smaller than the inside diameter of adsorber 46 and which projects preferably without contact into the former.

Adjusting means 48 for selectively guiding the exhaust gas into auxiliary line 36 which houses adsorber 46, and/or into main line 34 which bypasses the adsorber, is situated in the tubular element 58 and rotatably mounted therein. Adjusting means 48, designed for example as an exhaust gas valve, is moved by an actuator 62, for example, an electric motor. A sensor 64 may also be provided which detects the position of adjusting means 48. When adjusting means 48 is in the opened position, main line 34 is vacated and sealed in the closed position so that the exhaust gas flow is channeled through auxiliary line 36 and over adsorber 46. Preferably, adjusting means 48 may also be switched to intermediate positions so that part of the exhaust gas flow may be guided into main line 34 and part into auxiliary line 36.

Contrary to the related art, as seen for example in FIG. 2, gas-flow conducting element 58 ensures that, when adjusting means 48 is opened, the exhaust gas flow intended to bypass adsorber 46 does not directly act on the adsorber, but instead is channeled into main line 34. In this way, a leakage of exhaust gas flow through the adsorber is diminished when adjusting means 48 is opened, thereby reducing the emissions of adsorbed exhaust gas constituents. In this design the aperture plate 38 [sic] (see FIG. 2) connected downstream from adsorber 46 may also be eliminated.

As previously mentioned, the carrier of adsorber 46 is preferably a ceramic carrier as is generally known in exhaust gas technology. The desired storage function for hydrocarbons and/or nitrogen oxides is provided by a suitable washcoat-coating of the ceramic material in a known manner. For example, for carrying out an HC storage function, a coating containing zeolite may be used which stores HC by adsorption up to a certain temperature. Where an $NO_x$ storage function is to be established, suitable salts may be added, in particular salts of barium, for example, barium oxide and/or barium carbonate, which are capable of chemisorptive bonding (for example, as barium nitrate) with $NO_x$. It is also possible to add catalytic materials, in particular precious metals, to the coating in order in this way to also achieve a catalytic function, for example, a three-way catalytic converter.

In particular with regard to a ceramic carrier of the adsorber, the former may be advantageously designed as a particle filter for gasoline or diesel motor particle emissions. This is accomplished in a known manner via partly sealed flow channels so that the exhaust gas flow penetrates the permeable wall structures of the flow channels and is filtered. In the future, such a particle filtering function will become increasingly important for gasoline engines as well. Hence, the provision of a separate particle filter may, if necessary, be eliminated.

Exhaust gas system 10 represented in FIGS. 1 and 3 displays the following function, based on an HC adsorber 46. After a cold start of internal combustion engine 12, when catalytic converters 16 and 44 are not yet at operating temperature, adjusting means 48 upstream from main line 34 is initially closed so that the entire exhaust gas flow passes through HC adsorber 46. The latter stores the hydrocarbons contained in the exhaust gas which in the first seconds after engine start-up pass unconverted the not yet operational precatalytic converter 16. The size of adsorber 46 is configured in such a way that the hydrocarbons may be stored in full until precatalytic converter 16 has reached its light-off temperature and has taken over conversion from the adsorber.

Once precatalytic converter 16 has reached this temperature, which may be detected by modeling or by temperature sensor 50, adjusting means 48 is opened so that the hot exhaust gas flows directly over main catalytic converter 44 while heating it. At this stage, adsorber 46 may have already reached a temperature at which the stored hydrocarbons are released. However, since the adsorber is not yet perfused by the exhaust gas, virtually no purging of HC from adsorber 46 takes place. Once at least the upstream section of exhaust gas catalytic converter 44 has reached its light-off temperature, its heating is accelerated due to the exothermal conversion reactions.

If temperature sensor 52 indicates that main catalytic converter 44 has also reached its start-up temperature, adjusting means 48 is again partially or completely closed so that the entire or a specific portion of the exhaust gas flow is channeled over HC adsorber 46 and further heats the latter. Once the adsorber has reached its desorption temperature, the stored hydrocarbons are released and flow into the operational main catalytic converter 44, where they are converted to $CO_2$ and $H_2O$.

Figure 4:
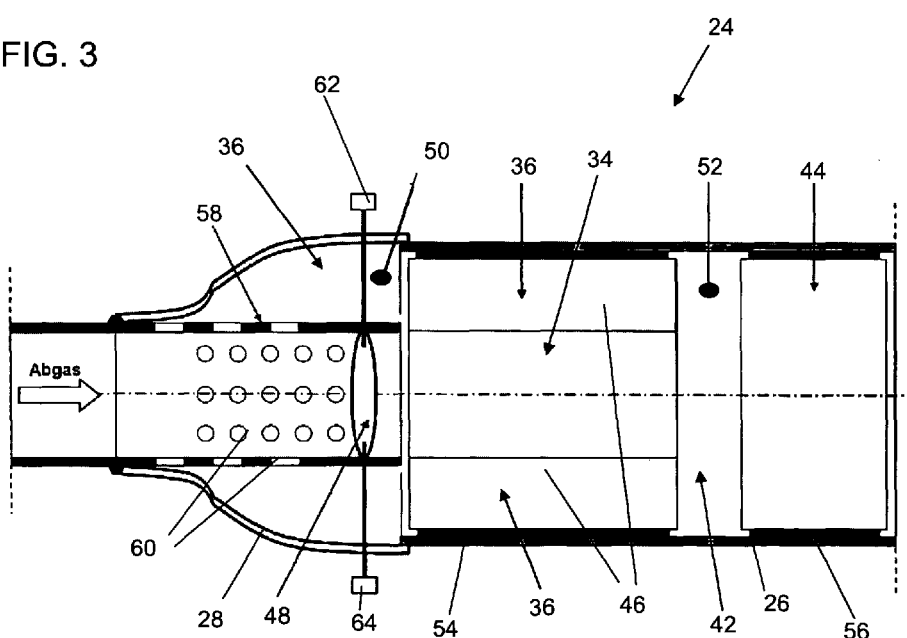
FIG. 4 shows a catalytic converter unit according to the present invention for an exhaust gas system as shown in FIG. 1 according to a second embodiment.

The specific embodiment of catalytic converter unit 24 according to the present invention shown in FIG. 4 differs from that shown in FIG. 3 solely in a longer design of tubular exhaust gas flow-conducting element 58, which in this case projects axially beyond inlet connection 28 of housing 26. Element 58 may, for example, be connected to the front edge of inlet connection 28 by a weld seam. The specific embodiment shown here essentially has production-related advantages over the embodiment seen in FIG. 3.

LIST OF REFERENCE NUMERALS 10 exhaust gas system
12 internal combustion engine
14 cylinder
16 precatalytic converter
18 exhaust pipe
20 first lambda sensor
22 second lambda sensor
24 catalytic converter unit
26 catalytic converter housing
28 inlet connection
30 outlet connection
32 inner pipe
34 main line
36 auxiliary line
38 junction area
40 junction opening
42 shared exhaust gas line
44 main catalytic converter
46 adsorber
48 adjusting means
50 temperature sensor
52 temperature sensor
54,56 bearing means (fiber or intumescent mat)
58 exhaust gas flow-conducting, gas-permeable element
60 through opening
62 actuator
64 sensor

What is claimed is:

1. An exhaust gas system for an internal combustion engine comprising:
    an exhaust gas path comprising two parallel exhaust gas lines, namely a main line and an auxiliary line, which open into a shared exhaust gas line;
    an adsorber arranged in the auxiliary line, said adsorber being configured for reversible sorption of unburnt hydrocarbons and/or nitrogen oxides ($NO_x$), wherein the exhaust gas system has no inner pipe supporting the adsorber;
    an adjusting means configured to selectively guide an exhaust gas flow into the main line and/or into the auxiliary line;
    a main catalytic converter situated downstream from the two parallel exhaust gas lines, said main catalytic converter located in the shared exhaust gas line, and
    a gas-permeable element having a plurality of through openings configured to conduct the exhaust gas flow, said gas-permeable element arranged upstream from the adsorber and configured to separate the auxiliary line other areas conducting the exhaust gas flow, wherein the gas-permeable element has a tubular shape and has a downstream end, said downstream end being located at an inlet opening of an inner one of the two parallel exhaust gas lines.

2. The exhaust gas system as recited in claim 1, wherein one of the two parallel exhaust gas lines encloses, at least in sections, the other one of the parallel exhaust gas lines.

3. The exhaust gas system as recited in claim 2, wherein the auxiliary line that houses the adsorber encloses the main line.

4. The exhaust gas system as recited in claim 2, wherein the gas-permeable element has a tubular shape, an upstream end of which is connected to a housing that houses the two parallel exhaust gas lines, or connected to an inlet connection of the housing.

5. The exhaust gas system as recited in claim 2, wherein the adjusting means is mounted in a downstream section of the gas-permeable element.

6. The exhaust gas system as recited in claim 1, wherein the adjusting means is configured to assume, in addition to a closed position and an opened position, at least one intermediate position, in which a portion of the exhaust gas flow is directed into the main line and another portion of the exhaust gas flow is directed into the auxiliary line.

7. The exhaust gas system as recited in claim 1, wherein the adsorber has a circular shape and the main line is defined by a cavity enclosed by the adsorber.

8. The exhaust gas system as recited in claim 1, wherein the adsorber includes a ceramic carrier.

9. The exhaust gas system as recited in claim 1, wherein the adsorber is also configured to filter particles.

10. The exhaust gas system as recited in claim 1, wherein the adsorber has a three-way catalytic function.

11. The exhaust gas system as recited in claim 1, wherein the main catalytic converter is a three-way catalytic converter.

12. The exhaust gas system as recited in claim 1, wherein the two parallel exhaust gas lines, the adsorber, the gas-permeable element and the adjusting means are situated in a shared catalytic converter housing.

13. A vehicle comprising:
an internal combustion engine; and
the exhaust gas system as recited in claim 1 connected to the internal combustion engine.

14. The exhaust gas system as recited in claim 2, wherein one of the two parallel exhaust gas lines concentrically encloses, at least in sections, the other one of the parallel exhaust gas lines.

15. The exhaust gas system as recited claim 1, wherein the gas-permeable element is located at an inlet opening of the main line.

16. The exhaust gas system as recited in claim 12, wherein the main catalytic converter is located in a downstream section of the shared catalytic converter housing.

17. The exhaust gas system as recited claim 1, wherein the main line is defined by the adsorber without a main line pipe.

\* \* \* \* \*